United States Patent [19]

Luciani

[11] Patent Number: 4,991,782
[45] Date of Patent: Feb. 12, 1991

[54] MACHINE AND METHOD FOR FORMING WINDINGS ON ELECTRIC MOTOR STATORS

[75] Inventor: Sabatino Luciani, Florence, Italy

[73] Assignee: Axis S.p.A., Firenze, Italy

[21] Appl. No.: 840,735

[22] Filed: Mar. 18, 1986

[30] Foreign Application Priority Data

Apr. 2, 1985 [IT] Italy ............................ 20184 A/85

[51] Int. Cl.$^5$ .................... H02K 15/06; H02K 3/12
[52] U.S. Cl. ............................. 242/1.10 R; 29/596
[58] Field of Search ............ 242/1.1 R, 1.1 E, 7.03; 29/596, 598, 729, 732, 733

[56] References Cited

U.S. PATENT DOCUMENTS

| | | |
|---|---|---|
| Re. 25,281 | 11/1962 | Moore . |
| Re. 28,831 | 5/1976 | Brown . |
| 1,407,033 | 2/1922 | Huggins . |
| 2,304,520 | 12/1942 | Wirtz et al. . |
| 2,328,785 | 9/1943 | Knobel . |
| 2,445,937 | 7/1948 | Carpenter . |
| 3,338,526 | 8/1967 | Shaff et al. ............ 242/1.1 R |
| 3,411,725 | 11/1968 | Biddison . |
| 3,648,938 | 3/1972 | Dryburgh . |
| 3,677,480 | 7/1972 | Schanke . |
| 3,750,969 | 8/1973 | Weis . |
| 3,822,830 | 7/1974 | Peters . |
| 3,985,164 | 10/1976 | Grawcock . |
| 3,995,785 | 12/1976 | Arick et al. ............ 242/1.1 R |
| 4,074,418 | 2/1978 | Pearsall . |
| 4,428,113 | 1/1984 | Fischer et al. . |
| 4,612,702 | 9/1986 | Wheeler ............ 242/1.1 R |

FOREIGN PATENT DOCUMENTS

| | | |
|---|---|---|
| 3328403 | 2/1984 | Fed. Rep. of Germany . |
| 2514211 | 4/1983 | France . |
| 569159 | 5/1945 | United Kingdom ............ 242/1.1 R |
| 2068787 | 8/1981 | United Kingdom . |

Primary Examiner—Katherine Matecki
Attorney, Agent, or Firm—Eric C. Woglom; Robert R. Jackson

[57] ABSTRACT

A needle of a stator winding machine is positioned such that its central longitudinal axis is eccentric relative to a central longitudinal axis of the stator. More particularly, the central longitudinal axis of the needle is spaced a predetermined distance from the central longitudinal axis of the stator along a line which is coincident with an axis about which slots in which a wire is being wound are symmetrical. The predetermined distance is selected such that the point of the needle extends at least to an end of a frontal tooth adapted to retain the wire in one of the slots.

28 Claims, 2 Drawing Sheets

MACHINE AND METHOD FOR FORMING WINDINGS ON ELECTRIC MOTOR STATORS

FIELD OF THE INVENTION

The present invention relates to machines for forming windings on electric motor stators.

BACKGROUND OF THE INVENTION

Machines for forming stator windings are known in which a needle, driven with rectilinear reciprocating motion combined with reciprocating rotary motion about its axis, carries at least one copper wire unwinding from a reel in order to deposit it in the stator armature slot. The needle comprises one point if a single winding is to be made, or comprises two opposing points if both windings are to be made simultaneously. In all cases, the needle always has its axis of advancement and rotation coinciding with the stator axis in order to enable it to slide in the open spaces between the slots within the stator during its to and fro movement and to lie equidistant from all the armature slots on which its points are to wind the copper wire.

In the case of a stator with two opposing windings, winding forms, also known as shoes, are applied to the ends of the respective slots, and are shaped in such a manner as to accompany or guide the copper wire of the needle into the slot, when the needle rotates external to the stator. These shoes have a basic and specific purpose in that, as stated, the needle is coaxial to the stator axis and thus its point cannot pass beyond the winding retention tooth during its rotation which takes place beyond the inner diameter of the stator, so that if the shoe is not used, the copper wire is unable to wind onto the slot beyond the retention tooth. If the retention tooth does not exist, only a few turns could be deposited, and these would represent only a small percentage of those required.

In addition to the need to construct these shoes accurately, they must also be properly sized for each stator to be constructed, even though they represent an element which forms no part of the final product. In this respect, the shoes are removed by two devices when the winding has been formed. Moreover, four tensioning devices have to be set up to hold the shoes rigidly against the stator during the forming stage, and to enable them to be rapidly released from it when the forming is complete.

SUMMARY OF THE INVENTION

A main object of the present invention is to provide a machine for forming a stator winding which enables the use of winding forms or shoes to be dispensed with, together with their tensioning devices and the devices which release them from the stator.

A further object of the invention is to improve the winding which is formed about each slot by reducing the needle stroke and the loop which the wire makes external to the stator as a result of the elimination of the shoes.

These and further objects which will be more apparent hereinafter are attained according to the present invention by an improved stator winding machine of the type which includes a needle driven with rectilinear reciprocating motion combined with reciprocating rotary motion about a central longitudinal axis thereof, the needle having a point adapted to deliver a copper wire into slots formed in an armature of the stator. In accordance with the improvement, the needle is positioned such that its central longitudinal axis is eccentric relative to a central longitudinal axis of the stator. More particularly, the central longitudinal axis of the needle is spaced a predetermined distance from the central longitudinal axis of the stator along a line which is coincident with an axis about which the slots of the stator are symmetrical. The predetermined distance is selected such that the point of the needle extends at least to an end of a frontal tooth adapted to retain the wire in a corresponding one of the slots.

BRIEF DESCRIPTION OF THE DRAWINGS

For a better understanding of the present invention, reference is made to the following detailed description of various exemplary embodiments considered in conjunction with the accompanying drawings in which.

DESCRIPTION OF THE EXEMPLARY EMBODIMENTS

Figure 1:
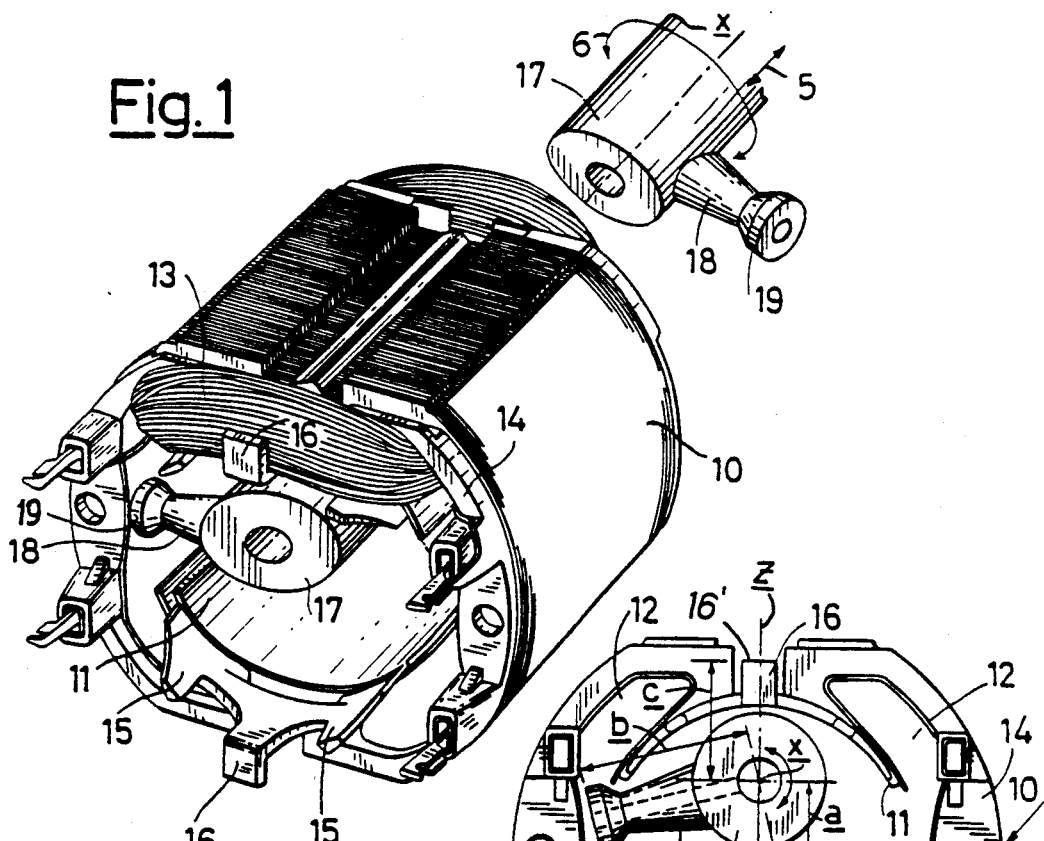
FIG. 1 is a perspective view of a stator and a needle arranged in accordance with the present invention, the needle being shown in two of its stages of movement relative to the stator.
Figure 2:
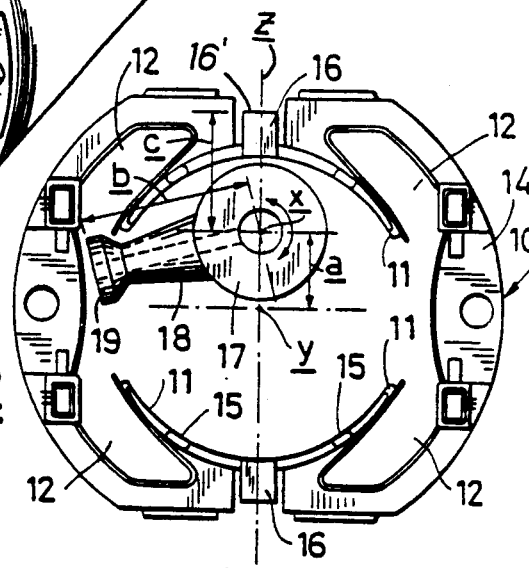
FIG. 2 is a front view of the stator and needle illustrated in FIG. 1.
Figure 3:
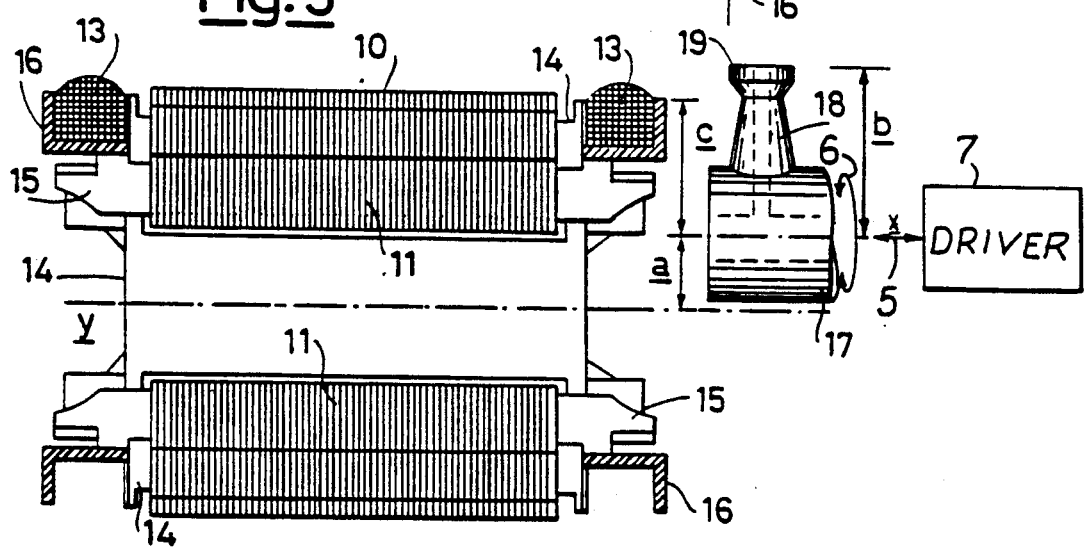
FIG. 3 is an axial cross-sectional view of the stator illustrated in FIG. 1, the needle being shown externally of the stator in non-sectioned form.

In FIGS. 1–3, there is illustrated a conventional two-winding stator which includes a hollow cylinder 10 made from high magnetic permeability laminations which on the inside of the structure assume two opposing dovetail configurations 11 defining slots 12 in which windings 13 are disposed. On the front and rear face of each stator, there are plastic sections 14 which reproduce its surface and which have supports 15 which project from the dovetails 11. Each of the sections 14 includes a tooth 16 adapted to form a frontal retainer for the winding 13 (not always essential).

A needle 17 (which is caused to alternately translate (arrows 5) and rotate (arrows 6) in the conventional manner by driver means 7 which may also be conventional (e.g., a mechanism of the type shown in U.S. Pat. No. 3,025,008) has a single point 18 and, in accordance with the present invention, has a central longitudinal axis (x) which is eccentric to a central longitudinal axis (y) of the stator. In accordance with the present invention, the axis (x) is a distance (a) from the axis (y) along an imaginary axis of symmetry (z) passing through the middle of the two opposing dovetails 11 such that the distance (b) between the axis (x) and an end 19 of the point 18 is greater than the distance (c) between the axis (x) and an end 16' of the tooth 16 which is closest to the axis (x). In order to obtain this geometric relationship, it is necessary only to move the stator out of its normal coaxial relationship with the needle 17, thereby keeping the entire apparatus which generates the reciprocating and rotary movement of the needle 17 unchanged. The eccentric (i.e., non-coaxial) relationship between the stator and the needle can be achieved by modifying the support for the stator so that its axis (y) is no longer coaxial with the axis (x) of the needle 17.

In operation, the needle 17 makes the winding 13 without requiring the aid of the shoes which are normally required when the stator and the needle 17 are arranged coaxially. The ability to dispense with the shoes stems from the fact that when the needle 17 is external to the stator and has to loop the wire about the supports 15, the point 18 is in a position almost in contact with the tooth 16 (see FIG. 3) and the end 19 of the point 18 is advantageously beyond the end 16' of the tooth 16 so that the wire which projects from the point 18 does not require any guidance in order to be deposited in the recess formed between the section 14 and the tooth 16.

If the axes (x) and (y) coincided (i.e., were coaxial), the point 18 of the needle 17 would not be able to project beyond the end 16' of the tooth 16, and this is the reason why shoes are currently used for guiding the wire delivered by the point 18 beyond the tooth 16 into the recess formed between the section 14 and the tooth 16. Dispensing with the use of the shoes gives an obvious manufacturing advantage by eliminating one component of a complicated manufacturing apparatus. It also enables the tensioning devices and the tensioning device passage slots provided between the section 14 and the cylinder 10 to be eliminated, thereby reducing the overall length of the stator and hence the stroke of the needle 17. The shorter needle stroke reduces the time required to form the winding 13. Moreover, by eliminating the shoes, the wire delivered by the needle 17 makes a smaller loop as it is practically in contact with the support 15 during the rotation of the point 18, and thus the winding 13 is improved in terms of its compactness.

Figure 4:
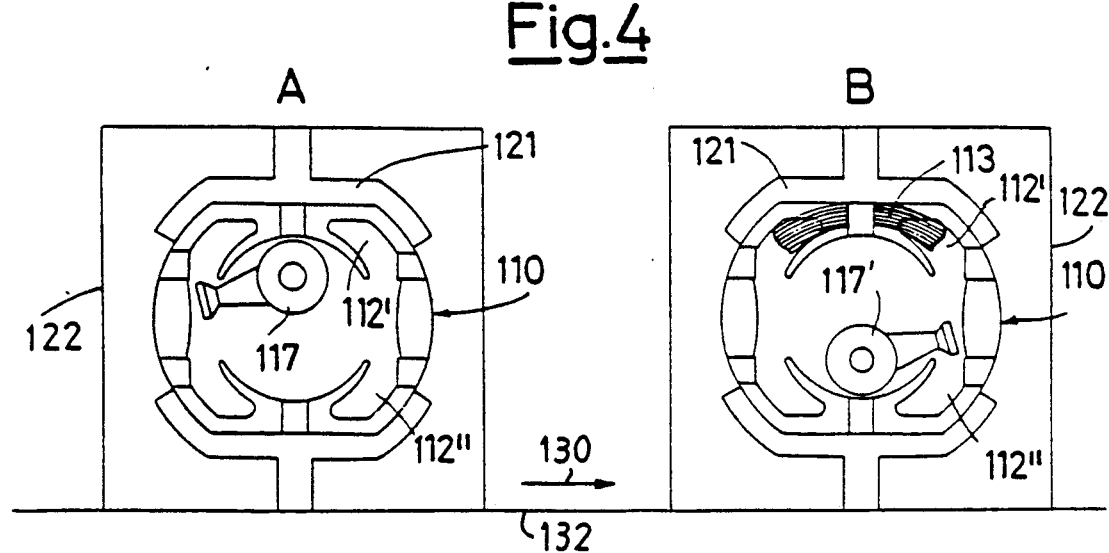
FIGS. 4, 5 and 6 are schematic illustrations of three different arrangements for winding stators in accordance with the present invention.
Figure 5:
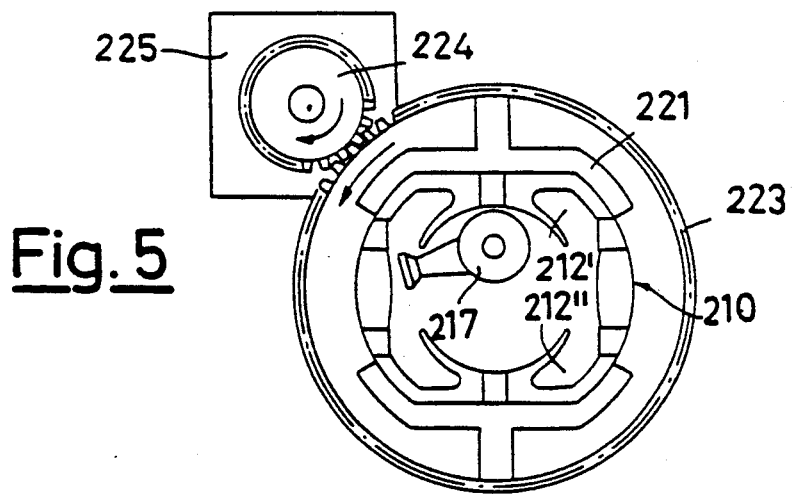
Figure 6:
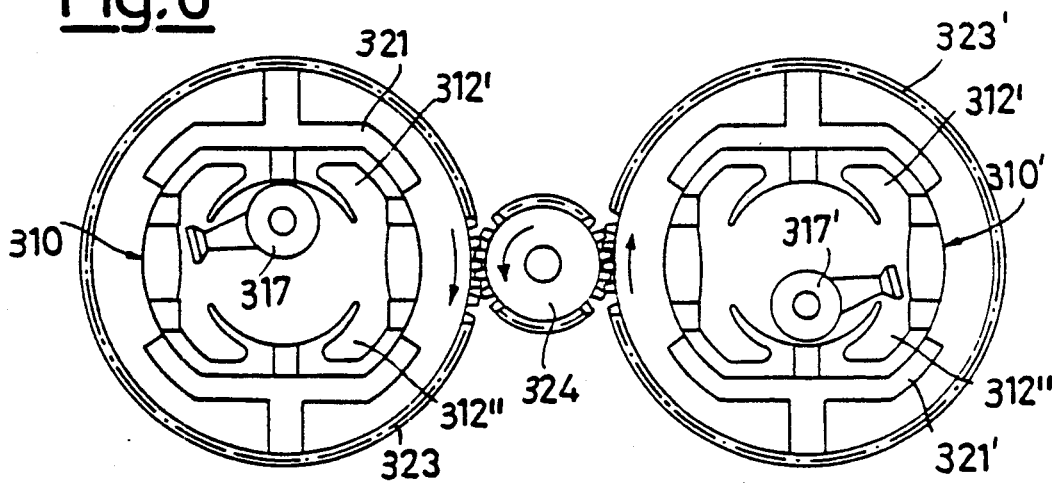

When the winding 13 has been terminated, the second winding on the opposite slots can be formed by various different methods. Some of these methods are illustrated in FIGS. 4-6. The various elements illustrated in FIGS. 4-6 which correspond to elements described above with respect to FIGS. 1-3 are designated by corresponding reference numerals increased by one hundred, two hundred and three hundred, respectively. All additional elements illustrated in FIGS. 4-6 which do not correspond to elements described above with respect to FIGS. 1-3 are designated by new reference numerals. The various additional elements illustrated in FIGS. 4-6 which correspond to previously described additional elements are designated by reference numerals increased by an appropriate factor of one hundred.

A first method can consist of providing a second work station downstream of the first work station in which a second needle is mounted eccentric to the stator as in the first station, but with respect to the other slot on which the new winding is to be formed. With reference to FIG. 4, a cylinder 110 of a stator is retained in position by jaws 121 of a frame 122 located at station (A) in which a needle 117 is eccentric to an upper slot 112'. When the winding 113 has been formed on it, the frame 122 is moved in the direction of arrow 130 (e.g., by a conventional conveyor 132) into a station (B) in which a needle 117' is eccentric to a lower slot 112" on which a second winding is to be formed.

Another method can consist of providing a device which causes the stator to rotate through 180° about its axis (y) so that, while keeping the position of the needle unchanged, the second slot now becomes located in the position previously occupied by the first slot with respect to the needle. Referring now to FIG. 5, the support frame for jaws 221, which grip a cylinder 210 of a stator to be wound, is in the form of a ring gear 223 which engages a gear wheel 224, which is rotated by a motor 225 so as to cause the stator to rotate through 180° after the formation of a winding in a slot 212' and thereby position a slot 212" in proper relationship with a needle 217 for the subsequent formation of another winding.

A third method is to provide two side-by-side stations operating on two stators, which are interconnected by a device adapted to simultaneously rotate them through 180°, so that each one is rotated through 180° about its own needle to enable windings to now be made in the empty slots. Inasmuch as windings would be formed on two stators simultaneously, this method would not increase winding times over those of machines employing needles with two opposing points for simultaneously forming windings in both of the slots. With reference to FIG. 6, cylinders 310, 310' of two side-by-side stators are gripped by jaws 321, 321', respectively, which are rotatably supported by ring gears 323, 323', respectively. After needles 317, 317' form windings in slots 312', 312", respectively, a gear wheel 324, which is rotated by a motor (not shown), rotates the ring gears 323, 323' and hence the cylinders 310, 310' of the stators through 180° about the needles 317, 317', respectively, to thereby properly position the empty slots of the stators for the subsequent formation of two more windings.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A machine for winding a stator having a hollow, substantially cylindrical outer member and at least one pole piece projecting radially inward from the inner surface of said outer member, the inner surface of said pole piece defining an arcuate segment of a cylindrical surface contained entirely within said outer member and having a central longitudinal axis substantially parallel to the longitudinal axis of said outer member, said arcuate segment being bounded by first and second longitudinally spaced arcuate end segments and by first and second arcuately spaced longitudinal side edges, each of said longitudinal side edges being substantially parallel to said central longitudinal axis, the inner surface of said outer member adjacent each of said first and second longitudinal side edges being spaced radially outward from said cylindrical surface to define first and second channels extending radially outward from said cylindrical surface alongside each of said first and second longitudinal side edges respectively, said machine comprising: a needle having a longitudinal axis and a point projecting transverse to said longitudinal axis, means for driving said needle, and means for delivering a wire through said point of said needle, said means for driving said needle including means for moving said needle in reciprocating linear motion along said longitudinal axis of said needle and in reciprocating rotary motion about said longitudinal axis of said needle, said machine further comprising means for positioning said stator relative to said needle so that said longitudinal axis of said needle is parallel to said central longitudinal axis and between said central longitudinal axis and said pole piece, said longitudinal axis of said needle being maintained at a predetermined distance from said central longitudinal axis and said point projecting outwardly into one of said first and second channels during said reciprocating linear motion of said needle and projecting radially outward beyond one of said first and second arcuate end segments during said reciprocating rotary motion.

2. A stator winding machine according claim 1, wherein said means for positioning is constructed and arranged to position the longitudinal axis of the needle along a line which is coincident with an axis of symmetry of the pole piece of said stator.

3. A stator winding machine according to claim 2, wherein said positioning means includes means for positioning said needle relative to said stator so that the point of the needle extends at least to an end of an outwardly projecting tooth on the stator as said needle rotates about said longitudinal axis of said needle.

4. A stator winding apparatus comprising two stator winding machines according to claim 1 wherein said stator has a second pole piece substantially identical to said at least one pole piece and arcuately spaced from said at least one pole piece, the needle of each said stator winding machine being arranged at its own winding station, and means for transferring said stator from one of said winding stations to the other of said winding stations, the needle of each said stator winding machine having the same relationship to a respective one of said pole pieces when said stator is at the winding station associated with that needle.

5. A stator winding machine according to claim 1 wherein said stator has a second pole piece substantially identical to said at least one pole piece and arcuately spaced 180° from said at least one pole piece, said machine further comprising means for turning the stator 180° relative to said central longitudinal axis.

6. A stator winding apparatus comprising two stator winding machines according to claim 1, the needle of each said stator winding machine being arranged at its own winding station, the winding stations being arranged side-by-side.

7. A method of forming a winding in a stator having a hollow, substantially cylindrical outer member and at least one pole piece projecting radially inward form the inner surface of said outer member, the inner surface of said pole piece defining an arcuate segment of a cylindrical surface contained entirely within said outer member and having a central longitudinal axis substantially parallel to the longitudinal axis of said outer member, said arcuate segment being bounded by first and second longitudinally spaced arcuate end segments and by first and second arcuately spaced longitudinal side edges, each of said longitudinal side edges being substantially parallel to said central longitudinal axis, the inner surface of said outer member adjacent each of said first and second longitudinal side edges being spaced radially outward from said cylindrical surface to define first and second channels extending radially outward from said cylindrical surface alongside each of said first and second longitudinal side edges respectively, said method involving the use of a needle having a longitudinal axis and a point projecting transverse to said longitudinal axis, said method comprising the steps of positioning the needle such that the longitudinal axis thereof is substantially parallel but eccentric to said central longitudinal axis, maintaining the longitudinal axis of said needle at a predetermined distance from said central longitudinal axis, reciprocating said needle along said longitudinal axis, rotating said needle about said longitudinal axis while said point of said needle is adjacent an end of said stator, and delivering wire from said point of said needle to thereby wind said wire onto said pole piece of said stator and form a winding on said pole piece, said predetermined distance being selected relative to the transverse projection of said point from said longitudinal axis of said needle so that said point projects outwardly into one of said first and second channels during said step of reciprocating said needle and so that said point projects radially outward beyond one of said first and second arcuate end segments during said step of rotating said needle.

8. A method according to claim 7, wherein said positioning step includes the step of placing said longitudinal axis of the needle at said pre-determined distance from said central longitudinal axis along a line which is coincident with an axis about which said first and second longitudinal side edges are symmetrical.

9. A method according to claim 7, wherein said stator has a tooth projecting outwardly away from said central longitudinal axis adjacent said pole piece at least one end of said stator, and said positioning and rotating steps are performed so that during said rotating step the point of the needle extends in the direction away from said central longitudinal axis at least to the end of said tooth remote from said central axis and said wire is deposited between said tooth and said pole piece.

10. A method according to claim 7, wherein said stator has a second pole piece substantially identical to said at least one pole piece and arcuately spaced from said at least one pole piece, and wherein said positioning, maintaining, reciprocating, rotating, and delivering steps are performed with a fist needle at a first winding station, said method further comprising the steps of transferring the stator from said first winding station to a second winding station, and repeating said positioning, maintaining, reciprocating, rotating, and delivering steps using a second needle at said second winding station to thereby form another winding on said second pole piece.

11. A method according to claim 7, wherein said stator has a second pole said winding is formed on a first one of said opposed pole piece substantially identical to said at least one pole piece and arcuately spaced 180° from said at least one pole piece, the method further comprising the step of turning the stator 180° about said central longitudinal axis after said winding is formed on said at least one pole piece, and then, after the stator is turned 180°, repeating said reciprocating, rotating, and delivering steps using said needle to thereby form another winding on said second pole piece.

12. A method according to claim 11, wherein said reciprocating, maintaining, rotating, delivering, turning and repeating steps are performed on a plurality of stators simultaneously, using a separate needle for each of said stators.

13. A method of manufacturing a stator assembly of an electric motor, comprising the steps of
positioning a hollow stator body relative to a wire feeding member, said hollow stator body defining an armature axis about which in the electric motor an armature rotates;
reciprocating the wire feeding member relative to said stator body through successive strokes along a second axis extending internally through said stator body eccentrically of said armature axis;

partially rotating said wire feeding member relative to said stator body about said second axis during said strokes; and emitting a wire from said wire feeding member during said reciprocating and rotating to wind said wire around an internal pole piece of said stator body to form a field coil, said wire being wound directly around said pole piece without the employment of temporarily positioned winding forms.

14. The method of claim 13, comprising securing an end of said wire relative to said stator body before winding said field coil, and wherein said emitting step comprises drawing said wire from said wire feeding member by movement of the latter.

15. The method of claim 13, wherein said eccentric axis is positioned between said central axis and said pole piece, said partial revolution is through an arc of more than 180 degrees, and as the winding of each turn of said field coil is completed the turn extends around a rectangular path.

16. The method of claim 13, wherein said second axis is positioned between said armature axis and said pole piece, and during said partially rotating said emitting of the wire is swept through the arcuate path that commences on one side of said pole piece, passes radially outwardly of an over said pole piece at a location beyond a respective axial end thereof, and then finishes on an opposite side of said pole piece.

17. The method of claim 13, wherein said partially rotating is through a partial revolution of more than 180 degrees, said emitting of the wire following a corresponding arc of more than 180 degrees which passes radially outwardly of said pole piece.

18. A method of manufacturing a stator assembly having a field coil wound on an internal pole of a stator body having a longitudinal passage therethrough defining an armature axis for rotation thereabout of an armature, said method comprising:

feeding a wire;

winding said wire about said internal pole by oscillating the feeding of the wire through said passage pat said pole and, during such oscillation, moving the feeding of the wire along a path concentric with an axis eccentric to said armature axis; and engaging and guiding said wire directly on said stator assembly during said moving of the feeding of the wire along said path.

19. The method of claim 18, wherein said pole has an inner cylindrical face concentric with said armature axis and said eccentric axis is located between said armature axis and said pole.

20. A method of winding a field coil around an internal pole of a stator body having a central opening therethrough defining a central axis, comprising the steps of:

drawing a field coil wire from a wire feeding outlet by movement of the latter;

reciprocating said wire feeding outlet in said central opening past said pole; and moving said wire feeding outlet when adjacent each end of said pole about an arc eccentric to said central axis and passing over said pole to wind said wire around said pole into a field coil without the employment of any temporarily positioned members to guide the wire around ends of said pole.

21. The method of claim 20, wherein said pole is shaped concentrically partially around said central axis and said eccentric axis is located between said central axis and said pole parallel to both.

22. A method of winding a field coil around an internal pole of a stator having a passage therethrough defining an axis for rotation of an armature therein relative to said pole, said method comprising the steps of:

feeding a field coil wire;

oscillating the feeding of said wire internally of the stator past said pole;

moving the feeding of said wire transversely to said axis adjacent an end of said pole along a path which extends over the end of the pole, said path increasing in distance from said axis over a portion of its length and then decreasing in distance from said axis over a subsequent portion of its length; and said oscillating and said moving effecting winding of the field coil around said pole without the employment of temporarily positioned winding forms.

23. The method of claim 22 wherein said path is an arc about a second axis located between said pole and said armature rotation axis and parallel to the latter.

24. A method of manufacturing a stator assembly having a field coil wound around an internal pole of a stator body, the latter having an axial passage therethrough defining of an armature, said method comprising:

drawing a field coil wire from a wire feeding outlet by movement of the latter;

reciprocating said wire feeding outlet axially through said passage along each side of said pole and just beyond each end of said pole;

moving said wire feeding outlet when adjacent each end of said pole through a circular arc having a center eccentric to said armature axis, said center being located between said armature axis and said pole, and a mid-portion of said arc extending radially outwardly of a neck portion of said pole connecting said pole to a main body portion of said stator body; and and reciprocating and said moving of said wire feeding outlet effecting winding of said wire around said pole into the field coil without the employment of temporary winding forms, said mid-portion of said arc causing said wire when just beyond the ends of said pole to be raised radially over and above said pole ends to form end turns of said field coil.

25. The method of claim 24, wherein said wire feeding outlet is formed at a radially outer end of an arm extending radially outwardly from a wire feed tube, said reciprocating and moving of said wire feeding outlet being effected by reciprocating said tube along and partially rotating said tube about an axis passing through said center parallel to said armature axis.

26. The method of claim 24, wherein a portion of said pole extends transversely away from said neck portion on each side of said neck portion to define a circumferential slot on each side of said neck portion between said pole and said main body portion of said stator body, and said arc, when viewed along said armature axis, commences in said axial passage, enters one said slot, passes radially beyond said neck portion, and returns to said axial passage through the slot on the other side of said neck portion.

27. A method of winding a field coil on an internal pole of a hollow stator assembly defining a central armature axis, said pole being connected by a neck portion to a body portion of said stator assembly with a slot extending away from each side of said neck portion between said pole and said body portion, said method comprising:

drawing a wire from a dispensing outlet on an arm of a wire dispensing tube by movement of said tube;

reciprocating said tube along an eccentric axis parallel to said armature axis and located between said armature axis and said pole to lay said wire in said slots;

partially rotating said tube on said eccentric axis when said outlet is adjacent either end of said pole to cause said outlet to follow a circular arcuate path about said eccentric axis, said arcuate path passing over the respective end of said pole radially outwardly of said neck portion;

said reciprocating and partially rotating of said tube effecting winding of said wire around said pole to form the field coil; and said arcuate path raising said wire radially above the pole ends with said wire being directly laid on said stator assembly throughout formation of end turns of said field coil, said end turns so being formed with the employment of temporarily positioned winding forms.

28. The method of claim 27, wherein said partially rotating of said tube is through an angle of more than 180 degrees.

* * * * *

UNITED STATES PATENT AND TRADEMARK OFFICE
CERTIFICATE OF CORRECTION

PATENT NO.  : 4,991,782
DATED       : February 12, 1991
INVENTOR(S) : Sabatino Luciani It is certified that error appears in the above-identified patent and that said Letters Patent is hereby corrected as shown below:

| Column | Line  |  |
|--------|-------|--|
| 5      | 8     | After "according" insert --to--. |
| 5      | 44    | Change "form" to --from--. |
| 6      | 22    | After "at" insert --at--. |
| 6      | 35    | Change "fist" to --first--. |
| 6      | 44-45 | Delete "said winding is formed on a first one of said opposed pole". |
| 7      | 41    | Change "pat" to --past--. |
| 8      | 23    | Delete "of". |
| 8      | 23    | After "armature" and before the comma insert --axis for relative rotation thereabout of an armature--. |
| 8      | 39    | Change "and" (first occurrence) to --said--. |
| 10     | 10    | Change "with" to --without--. |

Signed and Sealed this

Eighteenth Day of January, 1994

Attest:

BRUCE LEHMAN

Attesting Officer     Commissioner of Patents and Trademarks